United States Patent
Curutchet

(10) Patent No.: US 11,118,565 B2
(45) Date of Patent: Sep. 14, 2021

(54) FLUIDIC ROTOR HAVING ORIENTABLE BLADES WITH IMPROVED BLADE CONTROL

(71) Applicant: ADV TECH, Mérignac (FR)

(72) Inventor: Arnaud Curutchet, Mérignac (FR)

(73) Assignee: ADV TECH, Mérignac (FR)

(*) Notice: Subject to any disclaimer, the term of this patent is extended or adjusted under 35 U.S.C. 154(b) by 353 days.

(21) Appl. No.: 16/088,183

(22) PCT Filed: Mar. 30, 2017

(86) PCT No.: PCT/IB2017/051819
§ 371 (c)(1),
(2) Date: Sep. 25, 2018

(87) PCT Pub. No.: WO2017/168359
PCT Pub. Date: Oct. 5, 2017

(65) Prior Publication Data
US 2020/0300218 A1    Sep. 24, 2020

Related U.S. Application Data

(60) Provisional application No. 62/315,159, filed on Mar. 30, 2016, provisional application No. 62/395,441, filed on Sep. 16, 2016.

(51) Int. Cl.
*F03D 3/00* (2006.01)
*F03D 3/06* (2006.01)
(Continued)

(52) U.S. Cl.
CPC .............. *F03D 3/067* (2013.01); *B63H 1/08* (2013.01); *F03B 3/145* (2013.01); *F03B 17/065* (2013.01);
(Continued)

(58) Field of Classification Search
CPC .. F03D 3/067; F03D 7/06; F03B 3/145; F03B 17/065; B63H 1/08; F05D 2260/72; F05D 2260/76
See application file for complete search history.

(56) References Cited

U.S. PATENT DOCUMENTS 1,753,252 A * 4/1930 Strandgren .............. B63H 1/08
416/108
4,507,049 A * 3/1985 Strandgren ............. F03D 3/068
416/51

(Continued)

FOREIGN PATENT DOCUMENTS

JP    2006152922 A    6/2006
JP    2012112309 A    6/2012
(Continued)

OTHER PUBLICATIONS

Written Opinion in corresponding PCT Application No. PCT/IB2017/051819, dated Jul. 17, 2017 (an English translation attached hereto).
(Continued)

*Primary Examiner* — Ninh H. Nguyen
(74) *Attorney, Agent, or Firm* — Leason Ellis LLP

(57) ABSTRACT

In a rotating machine having a fluidic rotor, the rotor comprises at least one blade mounted on an arm rotating about a rotor shaft forming a main axis of the rotor, the rotor being kept by a supporting structure in an orientation such that said axis is substantially perpendicular to the direction of flow of the fluid, the blade being mounted so as to pivot about an axis of rotation of the blade parallel to the main axis. The machine comprises means for generating a relative oscillation movement of the blade with respect to the arm at the axis of rotation of the blade, in order in this way to vary the inclination of the blade during the rotation of the rotor. Said means comprise, at the arm end, a mechanism comprising a first rotating element (A; B) known as the drive element and a second rotating element (B; A) known as the driven element, the elements being mounted on mutually parallel axes of rotation and separated by an inter-axis distance, the orientation of the drive element being controlled depending on the orientation of the rotor shaft while the orientation of the driven element determines the orien- (Continued)

tation of the blade, one of the rotating elements comprising a finger (D) spaced apart from its axis of rotation and the other rotating element comprising a groove (C) which receives the finger and in which the finger can slide. Application notably to wind turbines, to marine turbines and to nautical and aircraft propellers.

12 Claims, 9 Drawing Sheets

(51) Int. Cl.
    *B63H 1/08*     (2006.01)
    *F03B 17/06*     (2006.01)
    *F03B 3/14*     (2006.01)

(52) U.S. Cl.
    CPC ...... *F05D 2260/72* (2013.01); *F05D 2260/76* (2013.01)

(56) References Cited

U.S. PATENT DOCUMENTS

| | | | |
|---|---|---|---|
| 5,324,164 A | 6/1994 | Doering et al. | |
| 5,676,524 A * | 10/1997 | Lukas | F03D 3/068 416/111 |
| 8,602,719 B2 * | 12/2013 | Kelly | F03D 3/068 415/4.2 |

FOREIGN PATENT DOCUMENTS

| | | |
|---|---|---|
| JP | 2014211141 A | 11/2014 |
| WO | 2014006603 A1 | 1/2014 |

OTHER PUBLICATIONS

International Search Report in corresponding PCT Application No. PCT/IB2017/051819, dated Jul. 17, 2017 (an English translation attached hereto).

* cited by examiner

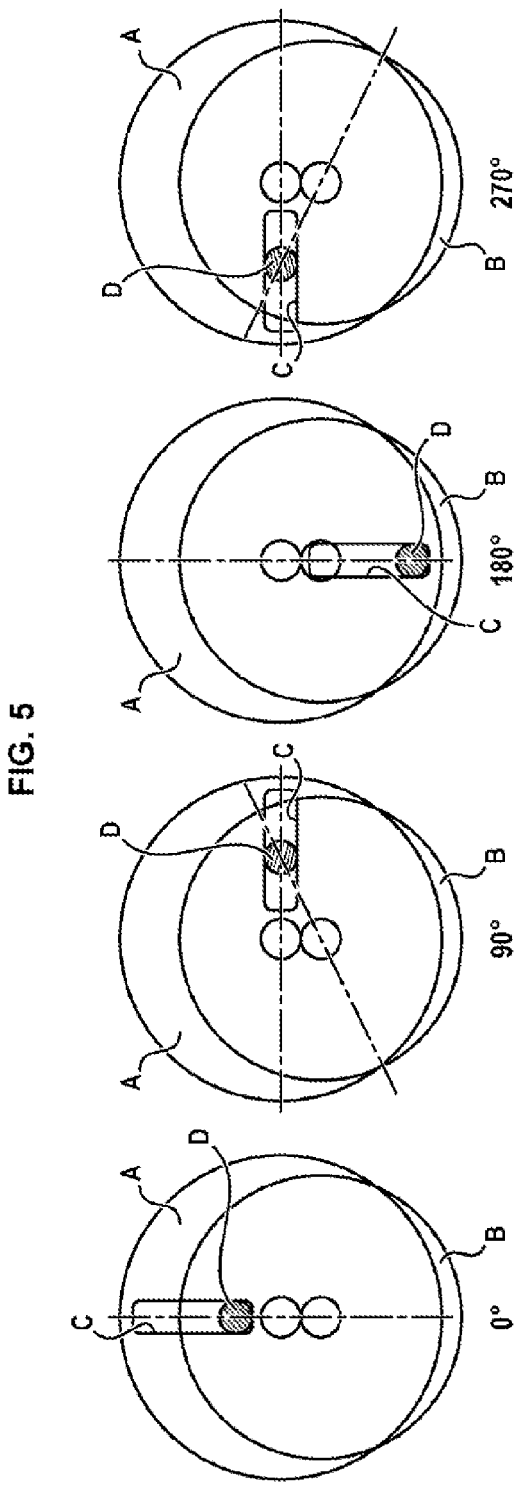

FLUIDIC ROTOR HAVING ORIENTABLE BLADES WITH IMPROVED BLADE CONTROL

CROSS-REFERENCE TO RELATED PATENT APPLICATIONS

This application is a U.S. National Stage Application under 35 U.S.C. § 371 of International Patent Application No. PCT/IB2017/051819, filed Mar. 30, 2017, which claims the benefit of priority under 35 U.S.C. Section 119(e) of U.S. Patent Application Nos. 62/315,159 filed Mar. 30, 2016, and 62/395,441 filed Sep. 16, 2016, all of which are incorporated by reference in their entireties. The International Application was published on Oct. 5, 2017, as International Publication No. WO 2017/168359 A1.

FIELD OF THE APPLICATION

The present invention concerns generally fluidic rotors having orientable blades designed to work in a gaseous or liquid environment, both to generate mechanical energy and to propel a moving body. These rotors apply particularly to wind turbines, marine turbines, nautical and aircraft propellers and turbines in general.

BACKGROUND TO THE INVENTION

Such a fluidic rotor with orientable blades is disclosed specifically by documents WO2014/006603A1 and WO2016/067251A1 in the name of the Applicant.

The blade control structure described in these documents, although effective for achieving the desired object of oscillation of the blades during the rotation of the rotor, still leaves a certain degree of complexity.

SUMMARY OF THE INVENTION

The invention aims to improve the control structure described in this document and to introduce at least one of the following advantages: greater simplicity, greater robustness, greater ease of adjustment, easier industrialization and better performance at high rotational speeds.

We therefore propose a 1. Rotating machine having a fluidic rotor, the rotor comprising at least one blade mounted on an arm rotating about a rotor shaft forming a main axis of the rotor, the rotor being kept by a supporting structure in an orientation such that said axis is substantially perpendicular to the direction of flow of the fluid, the blade being mounted so as to pivot about an axis of rotation of the blade parallel to the main axis, the machine comprising means for generating a relative oscillation movement of the blade with respect to the arm at the axis of rotation of the blade, in order in this way to vary the inclination of the blade during the rotation of the rotor, said means comprising, at the arm end, a mechanism comprising a first rotating element known as the drive element and a second rotating element known as the driven element, the elements being mounted on mutually parallel axes of rotation and separated by an inter-axis distance, the orientation of the drive element being controlled depending on the orientation of the rotor shaft while the orientation of the driven element determines the orientation of the blade, one of the rotating elements comprising a finger spaced apart from its axis of rotation and the other rotating element comprising a groove which receives the finger and in which the finger can slide.

In a preferred but optional manner, this machine features the following additional characteristics, taken individually or in any combinations that a person skilled in the art would deem to be technically compatible:
said groove is straight;
said groove is not straight;
the distance between the two ends of the groove is at least equal to double the inter-axis distance;
the machine comprises means to adjust the distance between the axes of rotation of the two elements;
the distance between the main axis of rotation of the rotor and the axis of rotation of the drive element is constant;
the distance between the main axis of rotation of the rotor and the axis of rotation of the driven element is constant;
the distances between the main axis of rotation of the rotor and the axes of rotation of the drive element and the driven element, respectively, are equal, wherein the drive element and the driven element are mounted on supports capable of being adjusted angularly;
the angular adjustment is performed about the main axis of the rotor;
the support for the driven element is formed by the arm of the associated blade;
the machine comprises means of disconnection between the rotor shaft and the driven element;
disconnection means are provided between the rotor shaft and an member that is engaged with the drive element.

BRIEF DESCRIPTION OF THE DRAWINGS

Further aspects, objects and advantages of the present invention will emerge more clearly from the following detailed description of preferred embodiments thereof, given by way of non-limiting example and made with reference to the accompanying drawings, in which:

FIG. 5 shows the mutual position of the elements according to the second configuration in four angular positions;

DETAILED DESCRIPTION OF PREFERRED EMBODIMENTS

Throughout the present description, reference shall be made to the rotor as described in application WO2014/006603A1, the contents of which shall be deemed to form part of the present description. The contents of application WO2016/067251A1 in the name of the Applicant shall also be deemed to form part of the present description.

Figure 1:
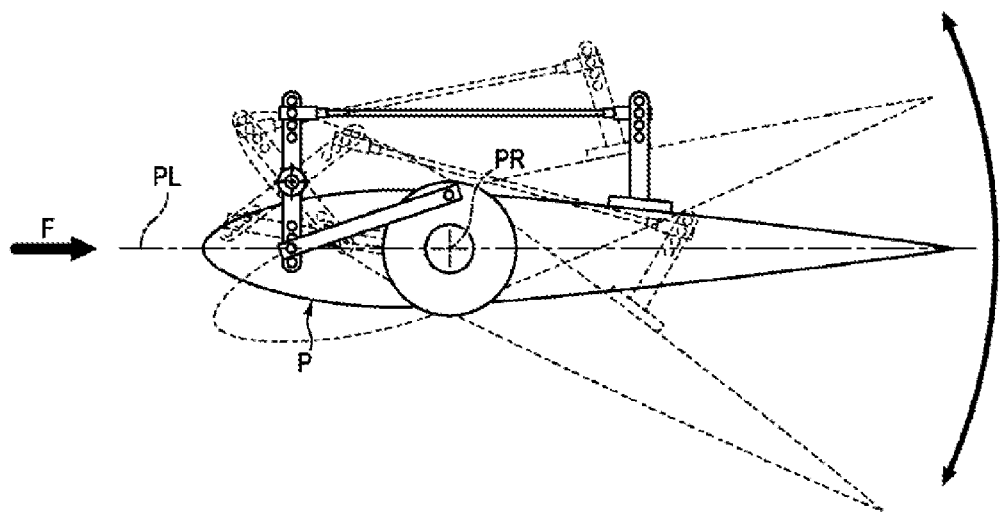
FIG. 1 is a schematic view of a side elevation of a rotor blade having orientable blades according to the prior art.

With reference firstly to FIG. 1, from the perspective of plane PL of a rotor blade P (in relation to the direction F of the flow of gas or liquid), the movement is an oscillating movement about a point of rotation PR located on the blade.

Figure 2:
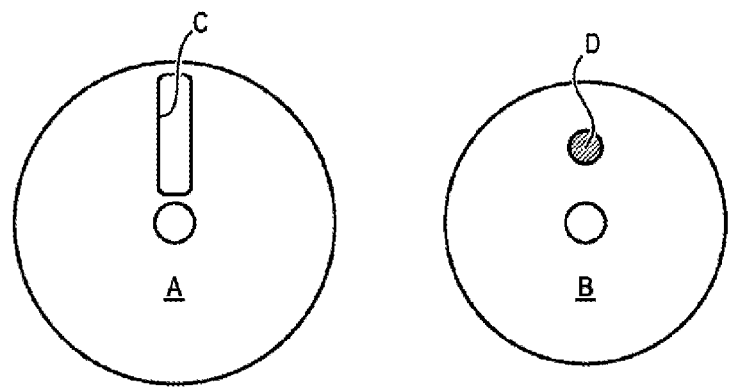
FIG. 2 shows schematically, in a front exploded view, two elements of a device to control the orientation of rotor blades according to the invention.

The basic elements implemented in the present invention are shown in FIG. 2: two elements A and B are driven one by the other while turning about two parallel axes. Element A is provided with a groove or slot C made in one of its radiuses. Element B is provided with a finger D, spaced apart by a distance x from the center of the disk. The finger D is provided to be able to slide in the groove or slot C of the disk A. It will be noted that the groove or slot C passes or does not pass fully through and has a form that is straight or not straight, depending on the kinematics desired to be produced.

It will be noted here that the diameters and even the shape of the elements A and B have no impact here, the only significant factors being the position of the finger D in relation to its own axis of rotation and the geometry of the slot C in relation to its own axis of rotation.

Figure 3A:
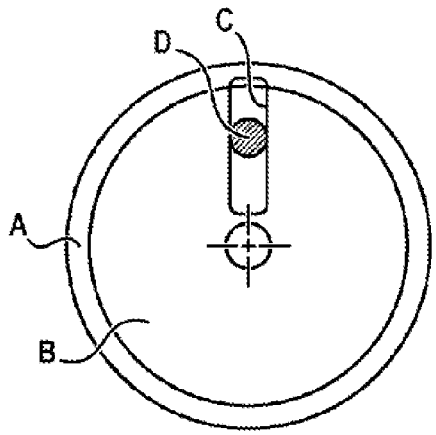
FIGS. 3A and 3B are front and profile schematic views respectively showing the cooperation of the elements of FIG. 2 in a first configuration.
Figure 3B:
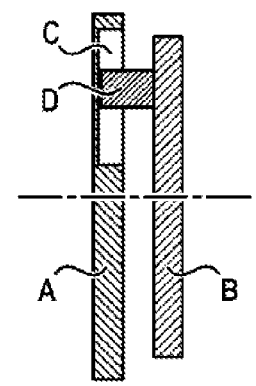

In FIGS. 3A and 3B, the axes of elements A and B are combined. One drives the other (and vice versa) in phase, i.e. with no angular misalignment between the two elements during their rotation.

Figure 4A:
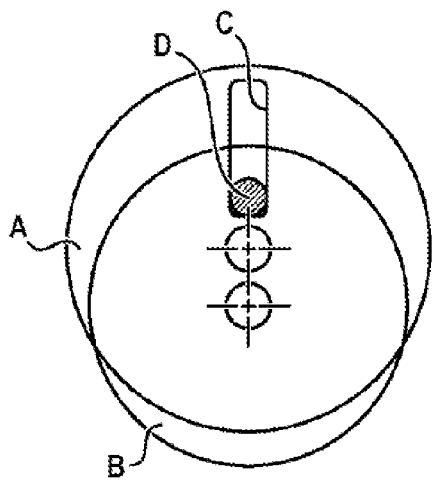
FIGS. 4A and 4B are front and profile schematic views respectively showing the cooperation of the elements of FIG. 2 in a second configuration.
Figure 4B:
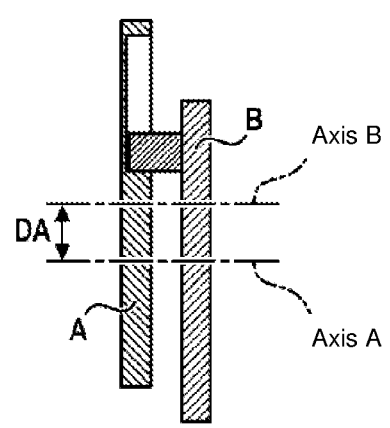

In FIGS. 4A and 4B, the axes of elements A and B are not combined (but are parallel to one another). In this case, element A drives element B (or vice versa), with the creation of an alternating angular misalignment between the two elements during rotation.

It will be noted that in order for the assembly formed of elements A and B to be able to operate, the travel length of the finger D in the groove C must be able to be double the distance DA of misalignment between the axes of elements A and B, which dictates the length of the groove C in order for it to afford this possibility. Moreover, the groove C must be wide enough to provide sufficient clearance for the finger D to move inside said groove while limiting friction. In this respect, the finger D must be advantageously provided with a ball bearing to ensure smooth sliding between the finger D and the walls of the groove C. These walls can moreover be made of a special wear-resistant material (surface treatment, chromium plating, etc.). As a variation, to promote groove/finger cooperation, a ball guide, ball sleeve, slider, etc. can be provided.

FIG. 5 shows the kinematics obtained with a straight groove and, in particular, the setting law generated for four angular positions. Here, element A is regarded as being provided with the groove C as the angular reference and it is assumed that element A is driving element B, turning in a clockwise direction in FIG. 5 (the opposite reasoning leads to the same result, to the nearby setting sign). The setting law can be summarized as follows:

position 0°: no angular misalignment;
position at 90°: element B lags behind by −x° in relation to element A;
position at 180°: no angular misalignment;
position at 270°: element B is ahead by +x° in relation to element A.

It is understood that, by adjusting the different parameters of the geometry such as the position, the shape and the dimensions of the groove C, the position of the finger D in relation to the axis of the disk B and the distance DA between the axes of rotation of the two disks, an infinite number of different setting laws can be obtained. Variations in the setting laws can also be obtained by choosing to perform the drive either by the element bearing the slot or groove, or by the element bearing the finger.

The setting laws produced can thus vary over a wide range, covering in particular sinusoidal type laws and trochoidal type laws.

By way of example, if a distance DA is chosen of 30 mm between the axes and 50 mm for the position of the finger D in relation to the center of rotation of the disk B, the amplitude of the angular misalignment x is on the order of 36°.

The incorporation of the mechanism into a rotor of the general type described in WO2014/006603A1 will now be described.

In this document, the angular position of the nacelle during the rotation of the rotor is assured by means of a belt (or a chain, or angle gears, or pinions) engaging around a pulley located on the main axis of rotation of the rotor, a pulley that is strictly speaking fixed (but capable of being controlled in energy-recovery mode in order to ensure the position of the blades in relation to the direction of flow, or in propeller mode in order to direct the flow generated).

In the present invention, according to a first embodiment, this mechanical connection drives the element A provided with the groove C (according to a second embodiment of the invention, this could be element B provided with the finger D).

The blade P that is to be controlled is directly or indirectly connected to the element B provided with the finger D. Thus the nacelle, crankshaft, connecting rod, gearing and linkage assembly of the rotor described in document WO2014/006603A1 is eliminated.

Figure 6:
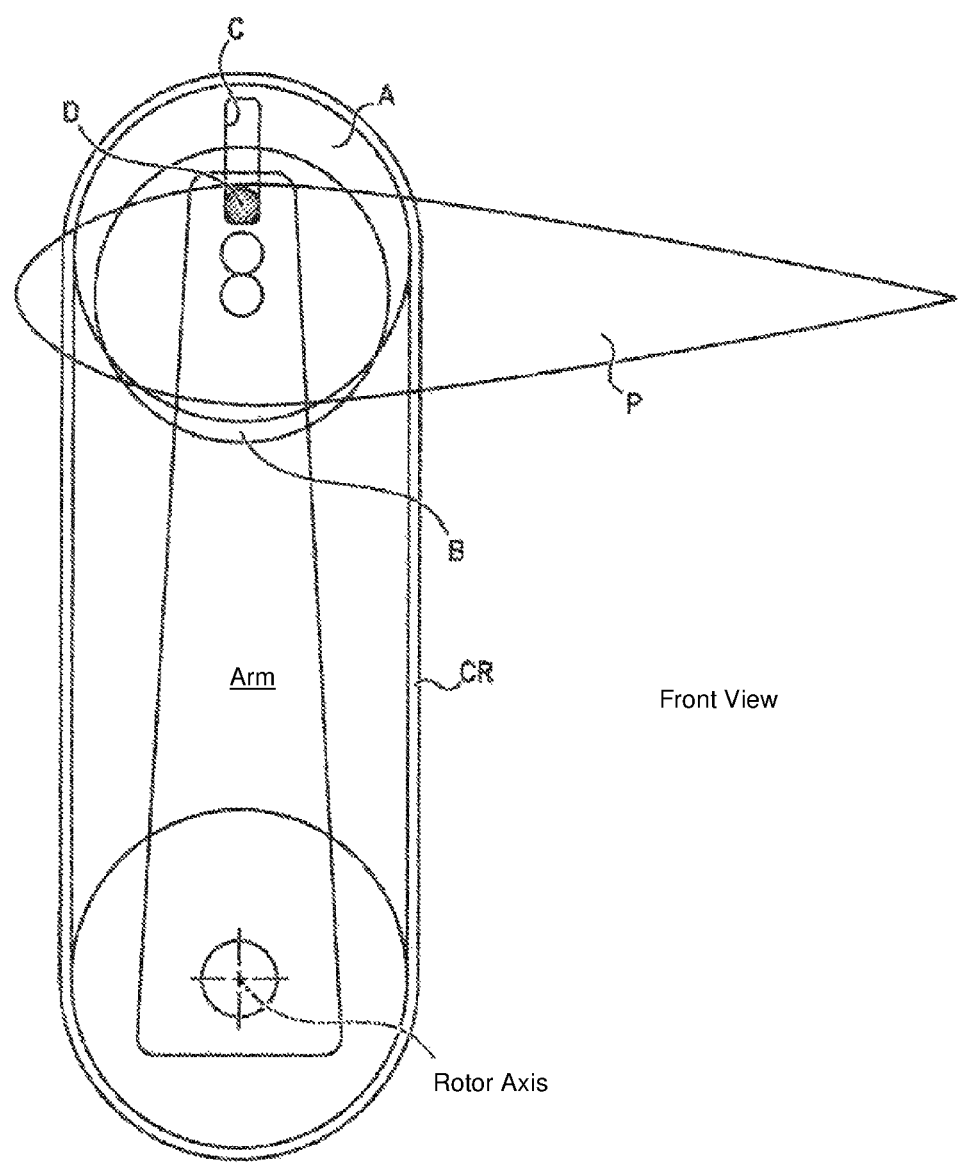
FIG. 6 shows a front view of the incorporation of the control device of FIGS. 2 to 5 in a rotor arm with orientable blades.
Figure 7:
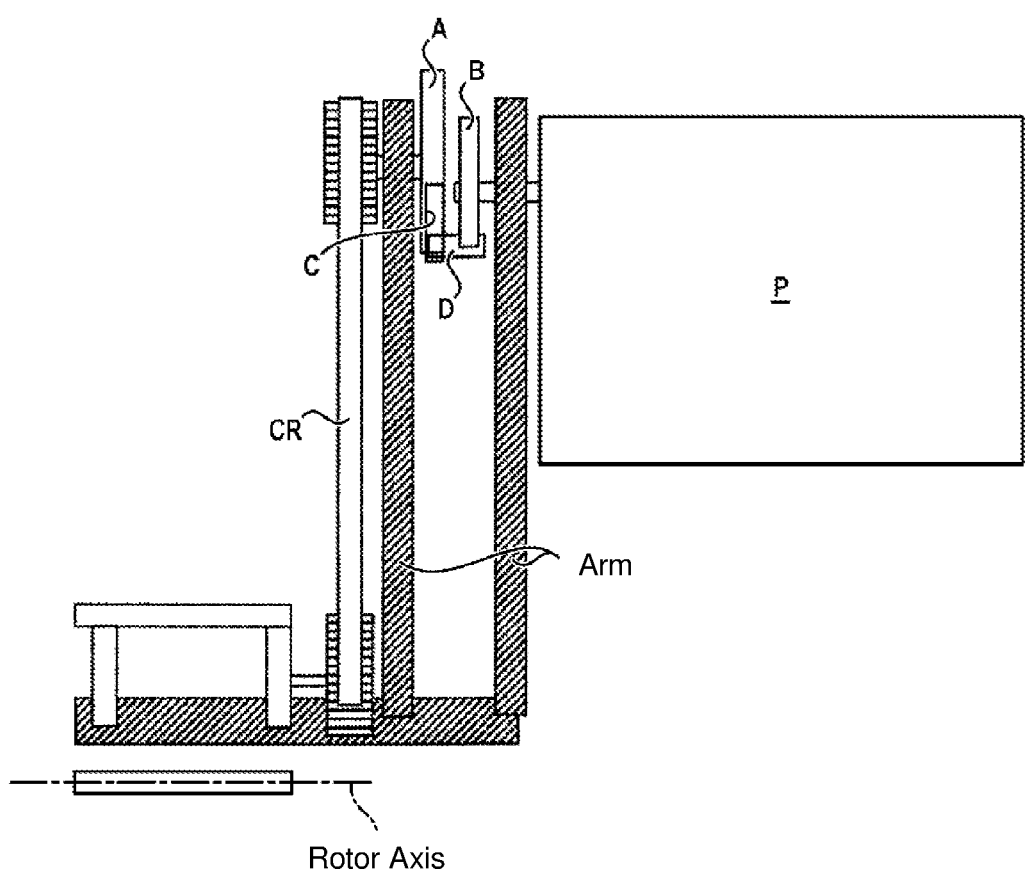
FIG. 7 is a profile view of the assembly of FIG. 6.

FIGS. 6 and 7 show this first embodiment: a belt CR drives element A, here disk-shaped, and the blade P is rotationally fixed with element B, here also disk-shaped. Here the groove C is straight.

Figure 8:
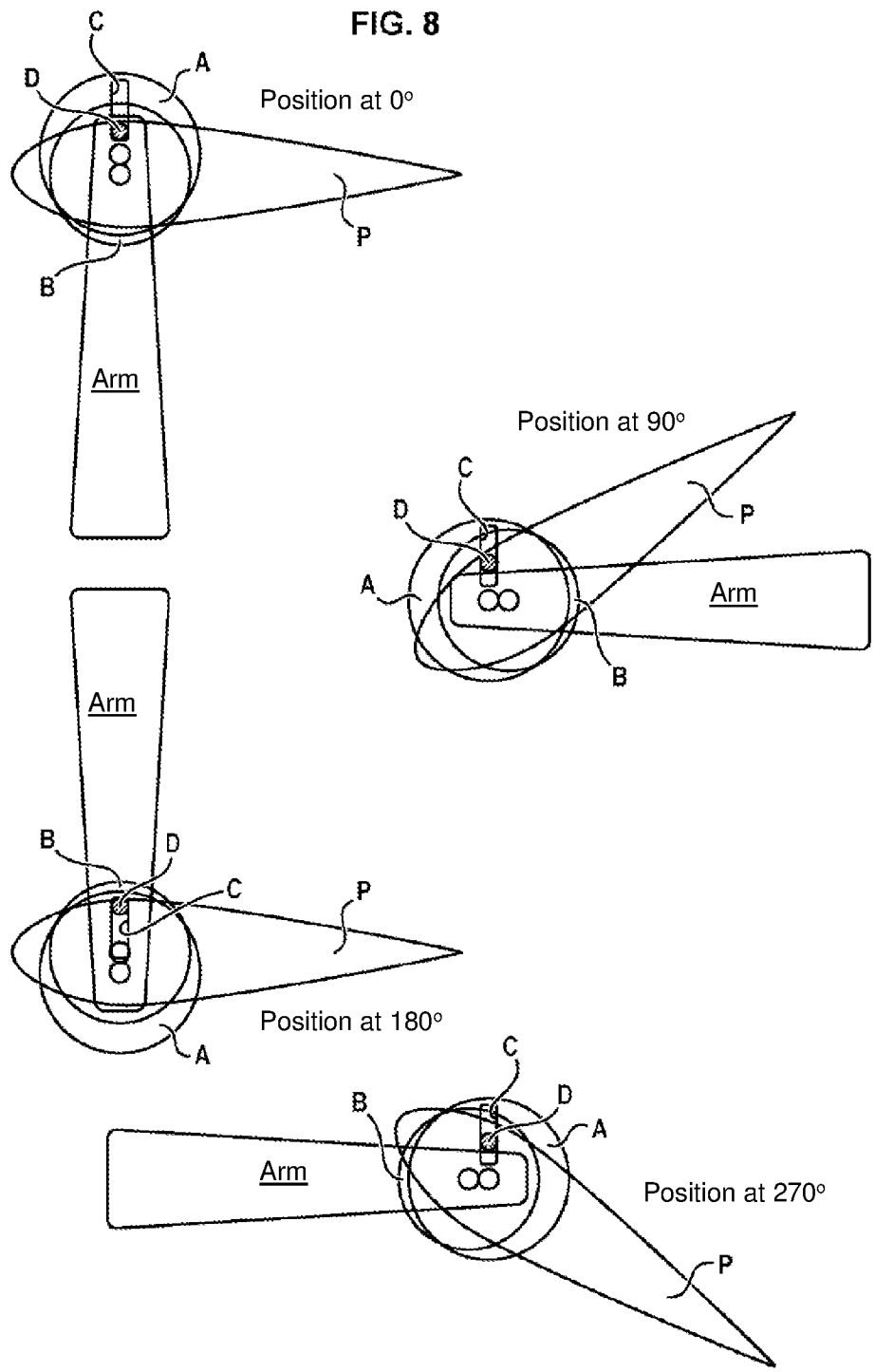
FIG. 8 shows the mutual position of the different parts of the assembly of FIGS. 7 and 8 in four angular positions.

It is assumed here that the rotor is turning in an anti-clockwise direction (i.e. in recovery mode, the motive flow, gaseous or liquid, coming from the left). Four positions, spaced apart from one another by 90°, are shown in FIG. 8. An orientation effect of the blade P similar to that described in WO2014/006603A1 is achieved. Of course, the mechanism formed by elements A and B and the driving means of element A are reproduced in as many numbers as there are blades P on the rotor.

The great simplicity and great strength of the mechanical solution of the present invention is easy to see from FIGS. 6 to 8.

We will now explain the mathematical law of angular displacement of element B in relation to element A (in the case of a straight and rectilinear groove).

Where:

R is the distance of the finger D in relation to the axis of rotation of element B, D is the distance between the axes of rotation of elements A and B, x=R/D, α is the angle of disk A in relation to the reference direction Ox, β is the angle of disk B in relation to the reference direction Ox.

It will be understood that if the misalignment D between the axes of rotation of the two disks is zero, then no angular misalignment will appear between the disks during rotation; in the case of a rotor with N blades, the blades would in this case be parallel to one another. This can have an impact when stopping the rotor.

The angular misalignment between element B and element A during the rotation of the disks is very close to a sinusoidal law of which the amplitude is directly proportional to the value x, according to the following equation:

$$\cos(\beta) = \frac{\cos^2(\alpha) - 1 + \cos(\alpha)\sqrt{\cos^2(\alpha) - 1 + x^2}}{x}$$

Figure 9:
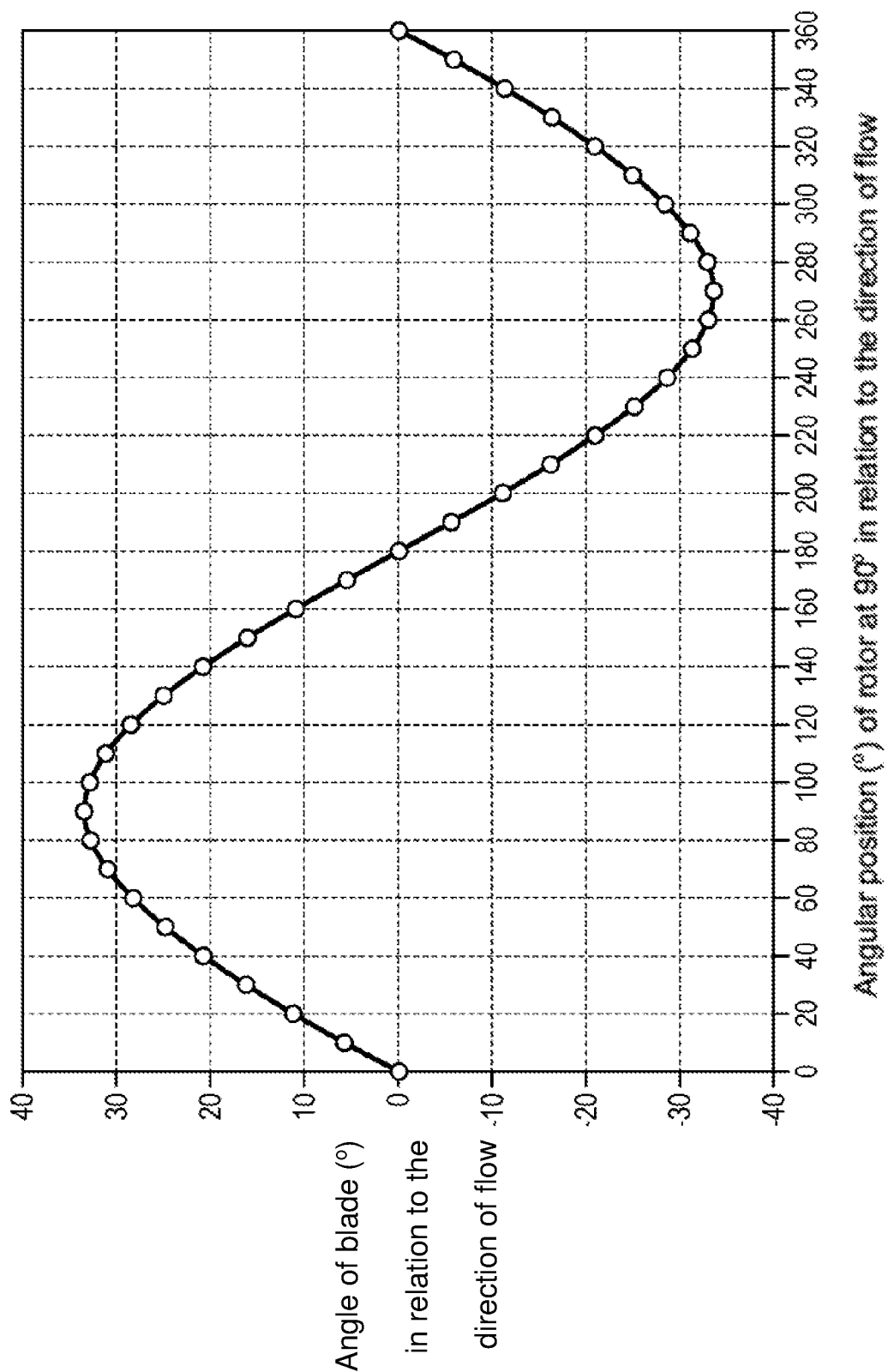
FIG. 9 gives an example of the angular setting law obtained with the orientation control device shown in FIGS. 2 to 8.

The graph in FIG. 9 shows the setting law of a blade identified in relation to the direction of flow (let us imagine for convenience a wind turbine application) with D=14 mm, R=25.2 mm, where x=1.8.

It will be observed that the law is very close to a sinusoidal law with an amplitude here of 33.75°.

We will now discuss the incorporation of the elements into the rotor and the way in which the setting law can be adjusted.

Although the position of the finger D is set by construction (even if according to one embodiment, the value R could be variable), it will be understood that it is advantageous to be able to control the distance D between the two elements A and B so as to be able to adjust the setting law according to the application and the operating speed of the rotor.

By way of example, when the rotor is operating in wind turbine mode, it is practical to be able to lower the aerodynamic efficiency Cp as the wind increases.

In propeller mode, it may be desirable to be able to vary the setting law depending on whether operation is at low or high speed.

FIGS. 6 to 8 show that the respective axes of disks A and B are on the same radius of the rotor that carries them. More precisely, it will be observed that the axis of rotation of disk A is further away from the axis of rotation of the rotor than the axis of rotation of disk B (but this could be the opposite: axis of disk A closer to the axis of the rotor than the axis of disk B).

In order to vary the amplitude setting law, it has been explained above that we could simply vary the distance between the axes of rotation of the two disks. According to this first embodiment where the two disks have their axis of rotation on the same radius of the rotor that carries them, several solutions can be envisaged:

- either the position of the axis of rotation of disk B and therefore the blade is changed, which, however, could present a certain technical complexity as regards control,
- or the position of the axis of rotation of disk A is changed; which, in this case could also be complex; in fact, if this disk is driven by a belt (or a chain) the belt must be kept under tension while controlling the synchronism between the disk and the groove and the central pulley; and in the case of control by 90° angle gears, it is possible to use grooved axes to enable the control to slide, but here too technically there may be a certain level of complexity;
- or even the axis of rotation of disk A is positioned at a distance r from the center of the rotor, the axis of rotation of disk B is positioned at the same distance r, and the two disks are mounted on two respective plates that can be angularly misaligned; thus in order to change the distance D, we need simply to angularly misalign (in relation to the main axis of rotation of the rotor) the plates supporting the two disks; one advantage is that according to this mode, the distance r is fixed, and so the inter-axis between the axis of rotation of each of disks A and B and the center of the rotor remains fixed; this makes it possible to eliminate the problems of variable tensions or geometries of the drives by belts, chains or gears (gear train or 90° angle gears), and to keep a fixed distance between the axes of the blades and the axis of the rotor.

Figure 10:
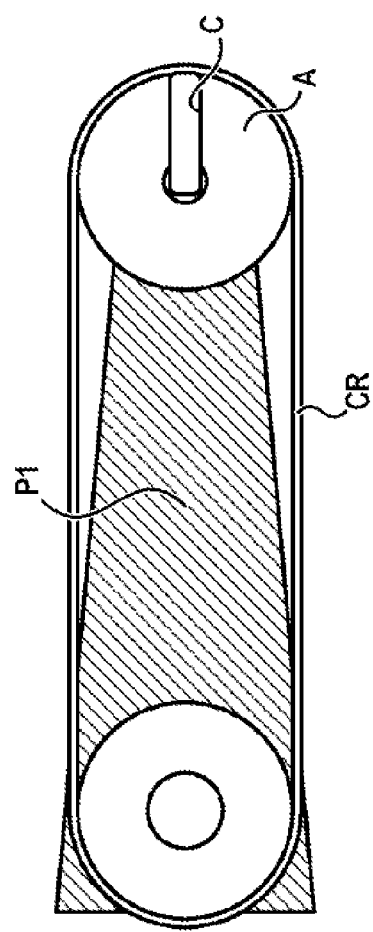
FIG. 10 shows a schematic front view of a first part of the mechanism for adjusting the amplitude of the orientation of the blades that can be implemented in a rotor with orientable blades.

FIGS. 10 to 13 show an implementation of this third possibility, with a belt drive, for one blade. FIG. 10 shows a plate P1 supporting the disk A provided with its groove C, this disk A forming a pulley driven by the belt CR. The belt CR, mounted on a fixed pulley centered on the axis of the rotor and of the same diameter as the pulley A, keeps the latter in a constant absolute orientation during the rotation of the rotor.

Figure 11:
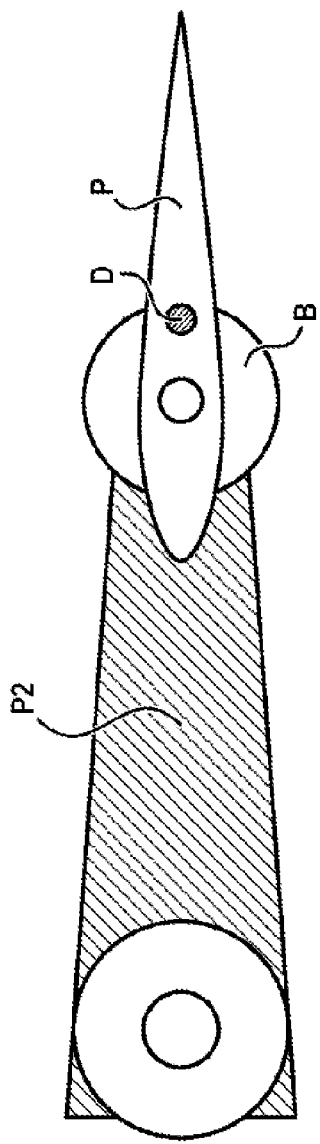
FIG. 11 shows a schematic front view of a second part of the adjustment mechanism.

FIG. 11 shows a plate P2 supporting the element B bearing the finger D, this element B driving the blade P.

Figure 12:
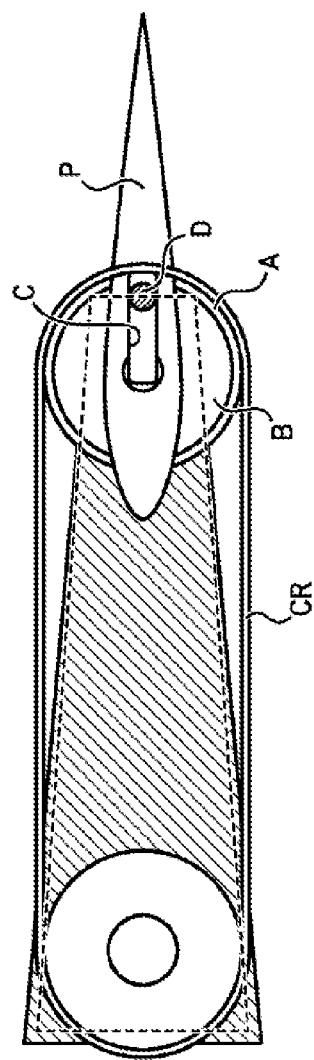
FIG. 12 shows a schematic front view of the two parts of the amplitude adjustment mechanism in a first mutual position.

In FIG. 12, the plates occupy positions such that there is no angular misalignment between them: the distance DA (distance between the axes of rotation of elements A and B) is zero, and so no angular misalignment is created between the two elements A and B during the rotation of the rotor.

Figure 13:
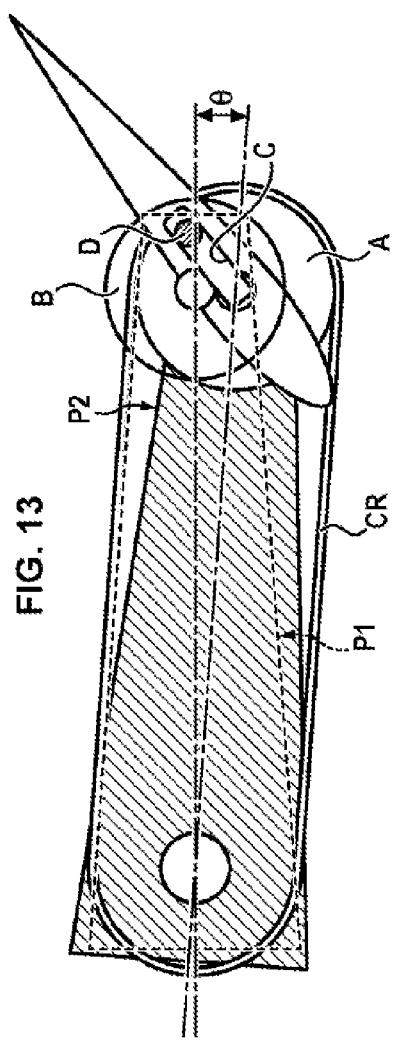
FIG. 13 shown a schematic front view of the two parts of the amplitude adjustment mechanism in a second mutual position.

In FIG. 13, the plates P1 and P2 have been displaced in relation to one another to create an angular misalignment θ between them; the distance DA is therefore not zero and the rotation of the rotor creates an angular misalignment between the two elements A and B during the rotation of the rotor, so as to change the orientation of the blade P correspondingly.

The adjustment of the mutual angular position of the two plates therefore results in a change of the setting law.

In a basic embodiment, this adjustment can be made statically when assembling the rotor: for example, plate P1 is provided with oblong holes allowing the angular misalignment to be adjusted once and for all, depending on the conditions and constraints of the desired application.

In certain applications, an active adjustment is required, where a control device is capable of adjusting, in real time or at least with an appropriate responsiveness, the angular misalignment between the two plates P1 and P2 to have the best setting law of the given operating conditions.

In one embodiment, electric actuators fitted directly onto the plates can be used, which involves introducing an electric control from the rotor support by means of rotating collectors. A wirelessly controlled system could also be provided to directly control the actuators, it being possible to power the latter either by small generators driven for example by belts and associated members (or chains, angle gears, etc.), or by a photovoltaic device.

A preferred solution is, however, to create a purely mechanical control from the center of the rotor up to each plate P1 or P2 in order to ensure its adjustment. An architecture to achieve this could involve a sliding axis (translation) inside the main axis of rotation of the rotor, said axis being driven in translation either by an actuator (electrical, hydraulic, etc.) controlled electronically, or by a purely mechanical system of the Watts regulator type. The other end of this control axis could be connected to a swashplate mounted on a bearing (the control axis does not turn with the rotor, whereas the swashplate does turn with the rotor). Clevises, ball joints and gears could emanate from this swashplate allowing the position of each element A in relation to each associated element B to be controlled.

We will now describe another solution to perform the adjustment of the distance DA between the axes of rotation of the elements A and B. According to this solution, the disk A provided with the groove C is kept with a fixed angular orientation in relation to the central pulley of the rotor and is mounted on a guide enabling it to slide along the rotor arm so as to reduce or increase the distance DA between the axes of rotation of the elements A and B, via a control brought to the center of the rotor or by means of appropriate actuators.

Since the chains or belts cannot as such cope with this variation of distance, one solution that enables this adjustment to be made is a transmission system with an angle gear transmission with a grooved axis.

It is, however, possible to adopt a belt or chain solution with a servo tensioning system.

In the specific case of a wind turbine application, a machine according to the invention advantageously comprises a safety device to reduce its aerodynamic efficiency to zero so as to be able to cope with storm conditions, or even to carry out maintenance work. One approach towards implementing this security feature involves releasing the servomechanisms of the blades so that they become free on their respective axis and behave like weather vanes, thus canceling out the torque that they could exert on the rotor. Another object is to be able simply to switch the control system back on without the need to readjust the blade setting law.

Figure 14:
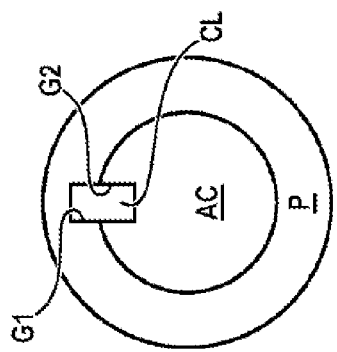
FIG. 14 shows schematically an example of a mechanism for the disconnection of the blade-orientation control.

The release of the blade mechanisms is ensured by releasing the pulleys that are arranged on the axis of the rotor and drive the belts (or the pinions that drive the chains). With reference to FIG. 14, this can be achieved by ensuring that a pulley or pinion P driving a belt or a chain has a groove G1, while the central shaft AC of the rotor is provided with a groove G2. The reference CL indicates a key capable of sliding along the axis AC in the groove formed jointly by grooves G1 and G2, both by the groove of the axis and by the groove of the pulley.

The release of the key CL can be achieved by an electronic control unit is response to signals from sensors, or by using a mechanical system released when the rotation of the rotor reaches a certain speed, for example a system using Watts pendulum type centrifugal force, associated with a trigger enabling the key to be released.

Clearly, the present invention is in no way limited to the embodiments described above and represented in the drawings, but a person skilled in the art would know how to apply numerous variations and modifications thereto. In particular:

torque limiters (for example with ball bearings) could be placed on the kinematic chain so as to ensure the integrity of the rotor in the event of use beyond set limits (for example in the event of a storm for a wind turbine); these torque limiters could, in one embodiment, be fitted between each blade and the element B that drives it;

each blade could be driven not by element B bearing the finger D, but by element A bearing the groove or slot C, element B then being driven by the belt, chain or other means of transmission from the center of the rotor. This results in a setting law that is the inverse function of that achieved when the blade is driven by element B and that can be preferable in certain cases.

Moreover, the mechanisms for adjusting the amplitude of the oscillation of the blades (i.e. of value x referred to above) can be applied by a person skilled in the art to the blade control systems referred to in documents WO2014/006603A1 and WO2016/067251A1.

As stated, the invention applies to the field of wind or marine turbines as well as to nautical and aircraft propellers. It also applies to the production of turbines, in which case a fairing is provided around the rotor to guide the flow. In this case, a generally uniform flow is obtained across the entire section swept by the rotor, unlike the case of the majority of conventional turbines.

The invention claimed is:

1. A rotating machine, comprising:
a fluidic rotor, the fluidic rotor comprising a plurality of blades mounted on an arm rotating about a rotor shaft forming a main axis of the fluidic rotor, the fluidic rotor being kept by a supporting structure in an orientation such that said main axis is substantially perpendicular to a direction of flow of a fluid, the plurality of blades being mounted so as to pivot about a rotational axis that is parallel to the main axis; and
a plurality of devices each associated with one of the plurality of blades for generating a relative oscillation movement of the associated blade with respect to the arm at the rotational axis to vary an inclination of the associated blade during a rotation of the fluidic rotor, each of the plurality of devices comprising:
at an arm end, a mechanism comprising a drive element and a driven element, the drive element and the driven element being mounted on mutually parallel axes of rotation and separated by an inter-axis distance, and
a transmission link between said rotor shaft and said drive element adapted to orient the drive element based on an orientation of the rotor shaft, wherein an orientation of the driven element determines an orientation of the associated blade, and wherein one of the drive element and the driven element comprises a finger spaced apart from its axis of rotation and the other of the drive element and the driven element comprises a groove adapted to slidably receive the finger.

2. The rotating machine according to claim 1, wherein said groove is straight.

3. The rotating machine according to claim 1, wherein said groove is not straight.

4. The rotating machine according to claim 1, wherein a distance between two ends of the groove is at least equal to double the inter-axis distance.

5. The rotating machine according to claim 1, which comprises a control device adapted to adjust the inter-axis distance between the drive element and the driven element.

6. The rotating machine according to claim 5, wherein a distance between the main axis of rotation of the fluidic rotor and the axis of rotation of the drive element is constant.

7. The rotating machine according to claim 6, wherein a distance between the main axis of rotation of the fluidic rotor and the axis of rotation of the driven element is constant.

8. The rotating machine according to claim 1, wherein distances between the main axis of rotation of the fluidic rotor and the axes of rotation of the drive element and the driven element, respectively, are equal, wherein the drive element and the driven element are mounted on supports capable of being adjusted angularly.

9. The rotating machine according to claim 8, wherein the angular adjustment is performed about the main axis of the fluidic rotor.

10. The rotating machine according to claim 9, wherein the support for the driven element is formed by the arm of the associated blade.

11. The rotating machine according to claim 1, further comprising a disconnecter between the rotor shaft and the driven element.

12. The rotating machine according to claim 11, wherein the disconnector is provided between the rotor shaft and a member that is engaged with the drive element.

\* \* \* \* \*